United States Patent
Nirmolo et al.

(10) Patent No.: US 11,828,386 B1
(45) Date of Patent: Nov. 28, 2023

(54) PURGE ASSEMBLIES FOR VALVES AND RELATED DEVICES, APPARATUS, SYSTEMS, AND METHODS

(71) Applicant: FLOWSERVE PTE. LTD., Singapore (SG)

(72) Inventors: Aryoso Nirmolo, Villach (AT); Péter Tóth, Zalaegerszeg (HU); András Tomor, Érd (HU); Chris Brydon, Reno, NV (US); Chris Shages, Bethlehem, PA (US); Larry Ray, Baytown, TX (US)

(73) Assignee: FLOWSERVE PTE. LTD.

( * ) Notice: Subject to any disclaimer, the term of this patent is extended or adjusted under 35 U.S.C. 154(b) by 0 days.

(21) Appl. No.: 17/751,739

(22) Filed: May 24, 2022

(51) Int. Cl.
*F16K 5/06* (2006.01)

(52) U.S. Cl.
CPC ................. *F16K 5/0605* (2013.01)

(58) Field of Classification Search
CPC ............ F16K 5/0605; Y10T 137/4259; Y10T 137/0424; Y10T 137/043; Y10T 137/0419; Y10T 137/4365; Y10T 137/4358; B08B 9/032
See application file for complete search history.

(56) References Cited

U.S. PATENT DOCUMENTS

| | | | | |
|---|---|---|---|---|
| 3,042,066 A | * | 7/1962 | Wolfensperger | F16K 5/227 137/246.11 |
| 3,770,016 A | * | 11/1973 | Johnstone | F16K 5/0605 137/625.22 |
| 3,990,465 A | * | 11/1976 | Allen | F16K 5/227 137/246.22 |
| 6,578,598 B2 | * | 6/2003 | Gardner | F16K 27/067 251/315.1 |
| 10,539,242 B2 | * | 1/2020 | Balan | F16K 5/0689 |
| 10,786,838 B2 | | 9/2020 | Decker et al. | |
| 2020/0261947 A1 | | 8/2020 | Decker | |

FOREIGN PATENT DOCUMENTS

| | | |
|---|---|---|
| CN | 215371062 U | 12/2021 |
| KR | 20160115059 A | 10/2016 |
| KR | 20170114183 A | 10/2017 |

OTHER PUBLICATIONS

International Search Report and Written Opinion for PCT/IB2023/055141, dated Sep. 13, 2023, 11 pages.

* cited by examiner

*Primary Examiner* — Michael R Reid
(74) *Attorney, Agent, or Firm* — PCFB LLC

(57) ABSTRACT

Valve assemblies, systems, and methods may include at least one purging assembly comprising at least one purge port extending through a valve body or housing in order to supply a purge fluid into the valve body or housing. The at least one purge port is positioned on the valve body or housing to redirect a portion of the purge fluid as the purge fluid exits the at least one purge port.

20 Claims, 5 Drawing Sheets

PURGE ASSEMBLIES FOR VALVES AND RELATED DEVICES, APPARATUS, SYSTEMS, AND METHODS

TECHNICAL FIELD

The present disclosure relates generally to purge assemblies and systems for valves, and, more particularly, to purge assemblies positioned and configured to redirect a portion of a purge fluid as the purge fluid exits a purge port of the purge assembly and related assemblies, systems, and methods.

BACKGROUND

Many valve types have been employed for stopping and controlling the flow of fluids in a pipe or other flow path. Each of these valves offers certain advantages while suffering from other disadvantages. Some valve types include plug valves, ball valves, stop or globe valves, angle valves, butterfly valves, and gate valves.

Ball valves comprise a valve or flow control element (e.g., rotatable ball) having a bore therethrough corresponding to the fluid flow path together with one or more seats for sealing with the ball surface. Typical ball valves have a valve body and a valve member (e.g., a ball) operatively connected to the valve body by an upstream and a downstream seal. The valve body defines a flow passage having an upstream flow-through end (e.g., a leading end), a downstream flow-through end (e.g., a trailing end), and a valve receiving chamber or cavity located between the upstream and downstream flow-through ends of the flow passage. The valve member is located within the valve receiving chamber, and includes a throughbore or process fluid flow passage that allows the passage of fluid through the valve member. The seals or seats, in conjunction with the valve member and the valve receiving chamber, define a cavity around the valve member. To prevent leakage of the valve, the seals or seats are pressed against the valve member with a given or fixed sealing pressure-based, at least in part, on the maximum pressure environment in which the valve may be installed.

The valve member is coupled to an actuator via a valve stem, which is selectively rotatable to rotate the valve member within the valve receiving chamber, between a fully open position and a fully closed position. Generally, in a two-way valve, the fully open position occurs when the throughbore is aligned with the flow passage at zero degrees of rotation from a centerline of the flow passage and the fully closed position occurs at ninety degrees of rotation of the valve member from the centerline.

In various processes, valves may be employed to control or isolate the flow of fluids containing or forming solids or other foreign materials, collectively referred to as "debris." During operation of the flow control element (e.g., the rotatable ball), the process fluid may communicate with the cavity between the valve body and the flow control element, where the entrained material may deposit and promote corrosion and/or interfere with the seals or operation of the valve. A purge of the valve ball may be employed where a relatively clean purge fluid is introduced from outside the ball valve into the cavity around the flow control element. In some instances, the purge fluid may maintain a positive pressure in the body cavity when the valve is not being operated (e.g., when the flow control element is in the fully open or fully closed position) to at least partially inhibit process fluid and/or debris entry. However, such valve purges may not always be effective to prevent the entry of the entrained materials into the cavity when the valve is operated between the fully open and fully closed positions and the process fluid communicates with the cavity, especially where the process fluid flow rate is much greater than the purge fluid flow rate, as is the usual operating case.

BRIEF SUMMARY

In some aspects, the techniques described herein relate to a valve assembly including: a valve body; a valve member positioned within a cavity in the valve body and configured to selectively enable fluid to pass through the valve body via at least one passage in the valve member; and at least one purging assembly including at least one purge port extending through the valve body in order to supply a purge fluid into the valve body, the at least one purge port positioned on the valve body to substantially directly supply a first portion of the purge fluid into the at least one passage of the valve member while simultaneously substantially directly supplying a second portion of the purge fluid to a portion of the cavity in the valve body extending between the valve body and the valve member.

In some aspects, the techniques described herein relate to a valve assembly, wherein the at least one purge port is positioned on the valve body to direct the purge fluid to one or more surfaces of the valve member in order to redirect a direction of fluid flow of at least one of the first portion of the purge fluid or the second portion of the purge fluid.

In some aspects, the techniques described herein relate to a valve assembly, wherein the at least one purge port is positioned to direct the purge fluid to an interface between an inner surface of the valve member defining the at least one passage and an outer surface of the valve member.

In some aspects, the techniques described herein relate to a valve assembly, wherein the interface of the valve member includes an arcuate edge of the valve member extending about an opening of the at least one passage on one radial side of the valve member.

In some aspects, the techniques described herein relate to a valve assembly, wherein the at least one purge port is positioned on the valve body to direct the purge fluid to one or more surfaces of the valve member in order to divide flow of the purge fluid into the first portion of the purge fluid and the second portion of the purge fluid.

In some aspects, the techniques described herein relate to a valve assembly, wherein the at least one purge port is positioned on the valve body to direct the purge fluid to one or more surfaces of the valve member in order to enable the first portion of the purge fluid to continue along a flow path into the at least one passage of the valve member and to redirect the second portion of the purge fluid into the portion of the cavity in the valve body extending between the valve body and the valve member.

In some aspects, the techniques described herein relate to a valve assembly, wherein the at least one purge port is positioned on the valve body to direct the purge fluid toward an obstruction in the valve body in order to diverge at least one of the first portion of the purge fluid or the second portion of the purge fluid.

In some aspects, the techniques described herein relate to a valve assembly, wherein the valve assembly includes a ball valve and the valve member includes a rotatable ball positioned in the valve body.

In some aspects, the techniques described herein relate to a valve assembly, further including a purge drain valve configured to drain the purge fluid supplied to the valve body with the at least one purging assembly.

In some aspects, the techniques described herein relate to a valve assembly, wherein the at least one purge port includes a single purge port.

In some aspects, the techniques described herein relate to a valve assembly, wherein the at least one purge port includes multiple purge ports (e.g., two to eight or more purge ports).

In some aspects, the techniques described herein relate to a valve system including: a valve assembly including: a valve body; and a valve member positioned within a cavity in the valve body and configured to selectively enable fluid to pass through the valve body via at least one passage in the valve member; and at least one purging assembly including at least one purge port extending through the valve body in order to supply a purge fluid into the valve body, the at least one purge port positioned and configured on the valve body to redirect a portion of the purge fluid as the purge fluid exits the at least one purge port.

In some aspects, the techniques described herein relate to a valve system, wherein the valve assembly includes a ball valve and the valve member includes a rotatable ball positioned in the valve body.

In some aspects, the techniques described herein relate to a valve system, wherein the at least one purge port is configured and positioned to redirect the portion of the purge fluid to a portion of the cavity in the valve body extending between the valve body and the valve member.

In some aspects, the techniques described herein relate to a valve system, wherein the at least one purge port is further configured and positioned to direct another portion of the purge fluid into the at least one passage of the valve member while simultaneously substantially directly supplying the portion of the purge fluid to the portion of the cavity in the valve body.

In some aspects, the techniques described herein relate to a valve system, further including a purge fluid source fluidly coupled to the at least one purge port.

In some aspects, the techniques described herein relate to a method of purging a valve, the method including: directing a purge fluid into a housing of a valve through at least one purge port extending through the housing of the valve; supplying a first portion of the purge fluid from the at least one purge port into at least one passage defined through a valve member, the valve member being received within a cavity defined within the housing of the valve; and substantially simultaneously supplying a second portion of the purge fluid to a portion of the cavity in the housing extending between the housing of the valve and the valve member.

In some aspects, the techniques described herein relate to a method, further including redirecting the second portion of the purge fluid with at least one surface of the valve member to direct the second portion of the purge fluid into the portion of the cavity.

In some aspects, the techniques described herein relate to a method, further including enabling the first portion of the purge fluid to travel from the at least one purge port substantially unaltered into the at least one passage defined through the valve member.

In some aspects, the techniques described herein relate to a method, further including redirecting at least one of the first portion of the purge fluid or the second portion of the purge fluid with an obstruction positioned within the housing of the valve.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
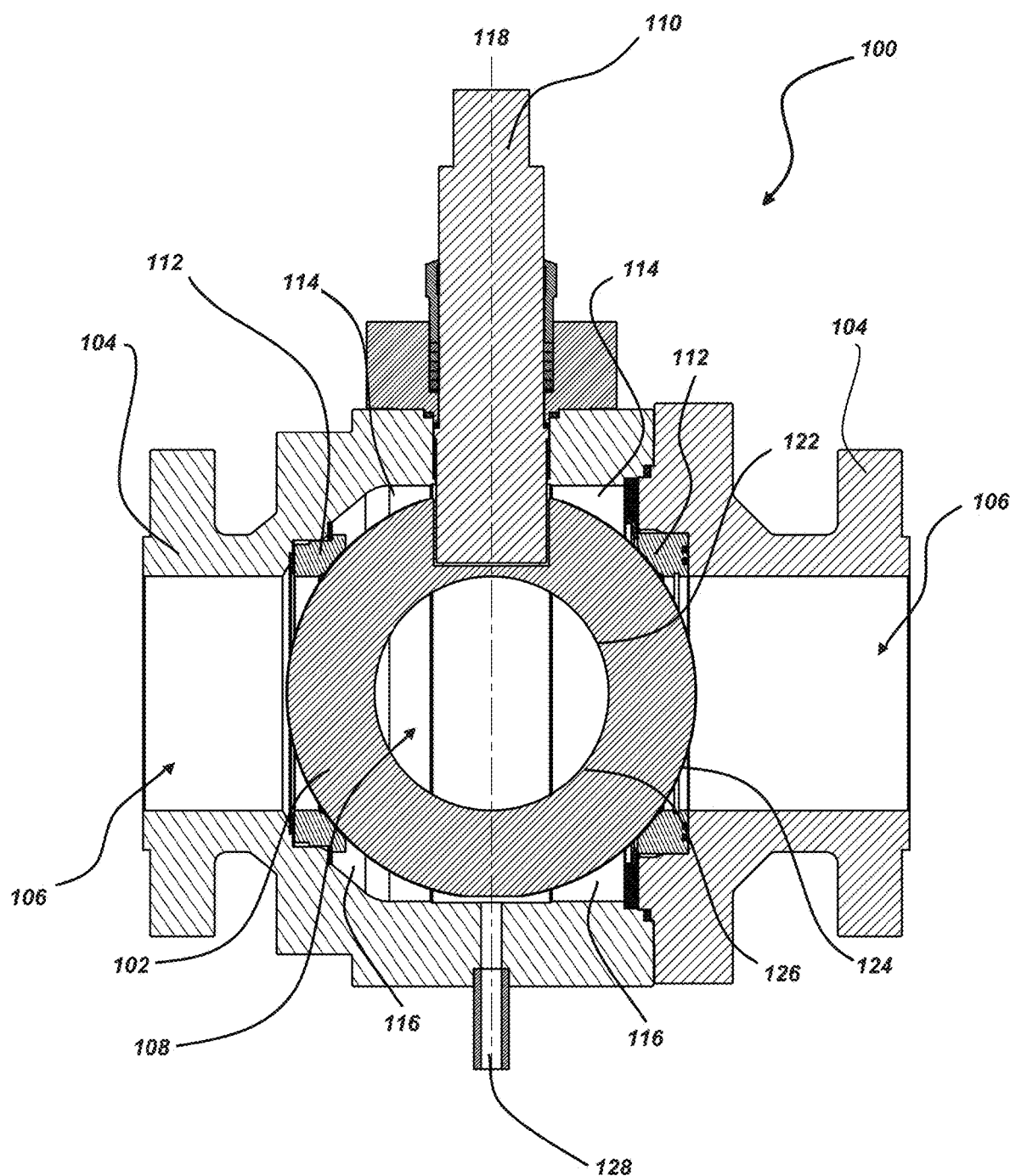
FIG. 1 is a cross-sectional side view of a valve including a purge assembly in a closed position in accordance with an embodiment of the disclosure.

The illustrations presented herein are not meant to be actual views of any particular fluid exchanger or component thereof, but are merely idealized representations employed to describe illustrative embodiments. The drawings are not necessarily to scale. Elements common between figures may retain the same numerical designation.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the term "substantially," "approximately," or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

As used herein, the term "fluid" may mean and include fluids of any type and composition. Fluids may take a liquid form, a gaseous form, or combinations thereof, and, in some instances, may include some solid material (e.g., particulates, debris, etc.).

Embodiments of the present disclosure include purging assemblies, systems, and configurations that may be utilized with valves (e.g., ball valves or other types of valves) used to control fluid flow in a system operated at normal environmental conditions and/or in high pressure and/or high-temperature systems. In some embodiments, such systems may include industrial applications (e.g., power plants, processing systems, mineral extraction, etc.), vehicles (e.g., ships, tankers, submarines, locomotives, etc.), or control systems (e.g., hydraulic systems, pneumatic systems, etc.).

As noted above, in some embodiments, the purging system may be implemented in ball valves. Ball valves are used in many and various technical applications, sometimes under extreme operating conditions with high temperatures and pressures (e.g., in the oil industry and/or energy industry), where the applied process medium is often a relatively dirty fluid. For safe and reliable operation, the valve may be cleaned with a well-designed purging system where a purging medium is delivered through high-pressure purge system ports in order to clean one or more of the surface of the ball, the body cavity, and/or other internal parts of the valve, depending on the location of the ports.

Such ball valves may be crucial safety components of various industrial facilities. Embodiments of the disclosure may enable such valves to be cleaned during operation using drain and purge ports located on the valve body. Embodiments of the present disclosure may provide a competitive advantage by at least partially providing an environmentally friendly operation in a given application by reducing the purge time and the amount of purging medium used. For example, reducing the amount of purging medium helps to reduce recycling and energy consumption, which also means reducing $CO_2$ emissions (decarbonization).

Purging of valves in accordance with embodiments of the disclosure may generally enable reliable and safe operation. For example, proper placement of purge ports used for cleaning the body cavity may improve the effectiveness of the purging process. In accordance with some embodiments of the current disclosure, one or more body cavity purge ports of a valve may direct the incoming jets to a location proximate to an obstruction, such as, for example, an interface (e.g., an edge) between two or more surfaces of the valve member. For example, the body cavity purge ports may direct the incoming jets to an interface between a process fluid flow passage through the valve member and an exterior surface of the valve member. The process fluid flow passage may be defined by an interior surface of a valve member (e.g., a ball) with the process fluid flow passage extending laterally or radially through the rotatable ball where the exterior surface of the valve member may at least partially surround the process fluid flow passage. In some embodiments, the interface may include a built-up region (e.g., one or more protrusions) or another add-on structure that functions as a diverter for the purge fluid flow.

With the mentioned arrangement, incoming purging fluid jets may be at least partially split (e.g., divided, diverted) where some of the purging medium (e.g., purging fluid) enters straight (e.g., continues into substantially straight line or path) into the process fluid flow passage, while a remainder of the flow may be diverted and flow into a cavity around the valve member (e.g., a cavity defined between a housing of the valve and the ball housed within the valve). Such a split flow concept enables the direct and substantially simultaneous purge of the cavity around the valve member and process fluid flow passage. Such purging may act to promote relatively faster and more effective cleanout of ball valves. The purging ports may operate in closed, open, and/or partially open positions of the valve.

In typical purging ports, the centerline of the inlet port is generally coincident with a normal line of the spherical ball surface where the purging medium usually flows radially into the body cavity or process fluid flow passage. In such a configuration, purging fluid is generally directed simply toward the ball surface. As the process fluid flow passage in the ball and the rest of the body cavity volume are generally defined as relatively well separated regions when the valve is closed, the whole or majority of the volume cannot be effectively purged with the such previous designs and methods.

Figure 2:
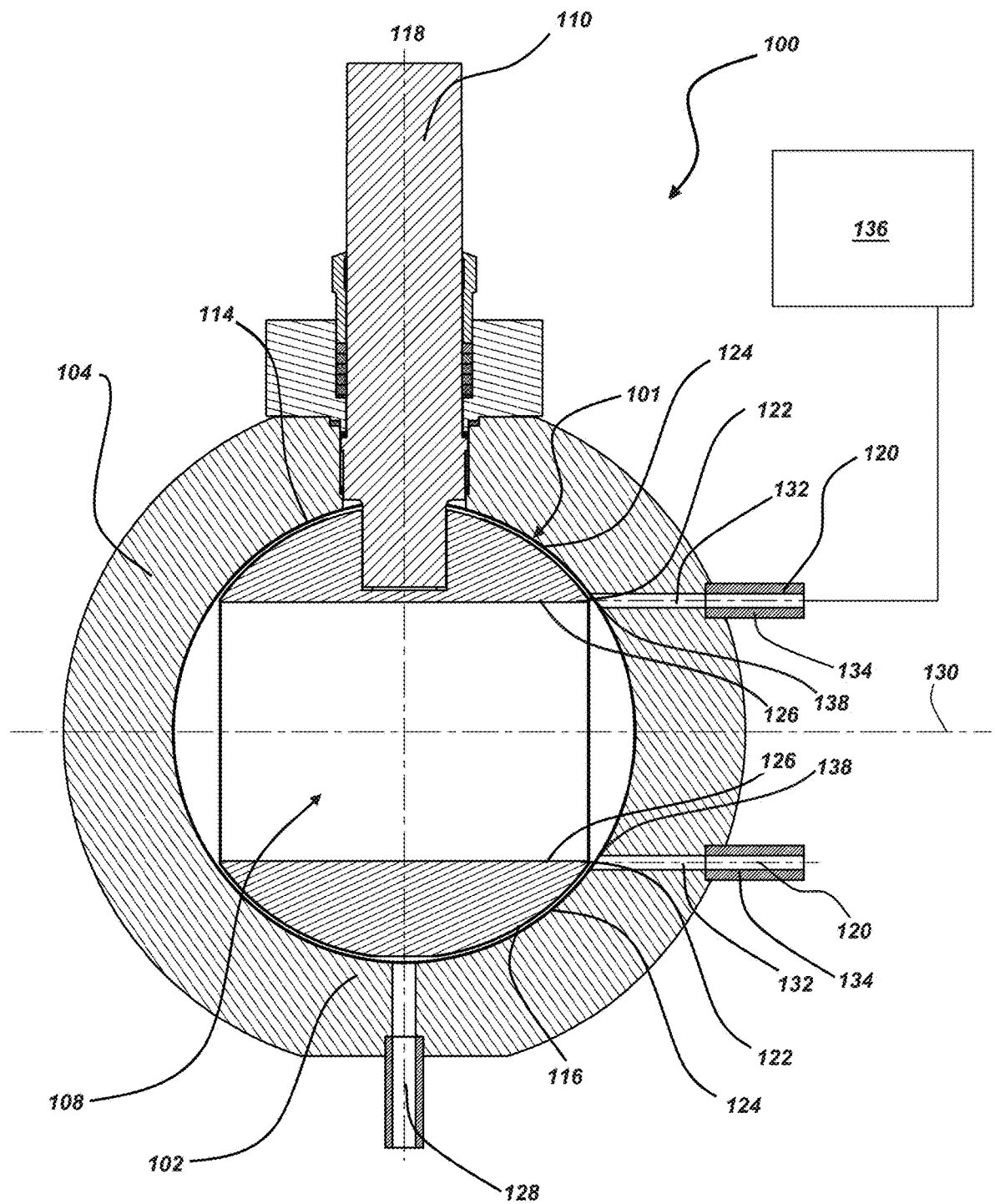
FIG. 2 is cross-sectional front view of the valve including the purge assembly in the closed position shown in FIG. 1.

FIG. 1 illustrates a cross-sectional view of a valve 100 (e.g., a ball valve) including one or more valve seats 112 in the closed position. FIG. 2 illustrates another cross-sectional view of the valve 100 (e.g., a front view taken in direction transverse to the cross-sectional side view of FIG. 1) in a closed position.

As shown in FIGS. 1 and 2, the ball valve 100 may include a valve member (e.g., ball 102, obstructor, etc.) movably positioned (e.g., floating or mounted) in a cavity 101 of the valve body 104 to control fluid flow through the valve 100. As depicted, the valve body 104 may include a central housing with two end caps, where one end cap and the central housing may be integrated to define a two-piece structure.

Figure 3:
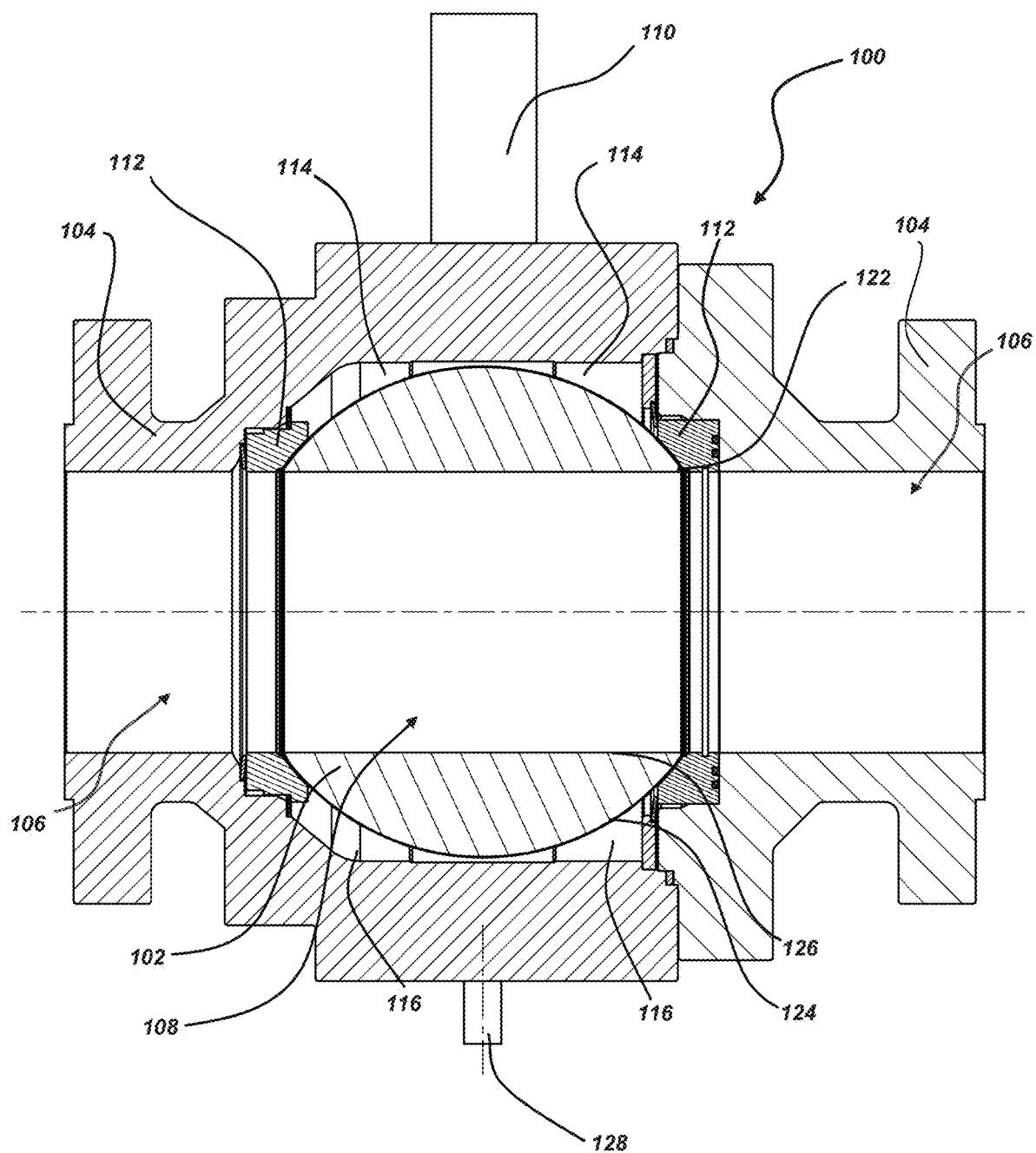
FIG. 3 is a cross-sectional side view of the valve including one or more valve seats of FIGS. 1 and 2 in an open position.

The valve body 104 may define a conduit 106 (e.g., path, passage, port, etc.) through the valve body 104. The ball 102 may include a process fluid flow passage 108 (e.g., port, hole, path, etc.) through the ball 102 that is selected placed in communication with the passage 108 when the valve 100 is in an open position. A stem 110 may extend through the valve body 104 and be operatively coupled to the ball 102. The ball 102 may be configured to selectively inhibit (e.g., obstruct, at least partially inhibit, substantially stop, substantially prevent, etc.) fluid flow through the ball valve 100 when the ball 102 is in a closed position (e.g., positioned such that the passage 108 is not aligned with the conduit 106), as illustrated in FIG. 1. The stem 110 may cause the ball to rotate between the closed position and an open position about a longitudinal axis 118 of the stem 110 (e.g., wherein the ball 102 is positioned such that the passage 108 is aligned with the conduit 106, as shown in FIG. 3).

The seats 112 (e.g., seals, annular rings, etc.) may be positioned within the valve body 104 where the ball 102 and the conduits 106 in the end caps meet. Each valve seat 112 forms a substantially fluid-tight seal through engagement with portions of the valve 100, for example, with the valve member or ball 102 and the valve body 104. The seats 112 may at least partially or substantially entirely inhibit flow of fluid around the ball valve 100 when the ball 102 is in a closed position and/or an open position by defining one or more seals between the ball 102 and the valve body 104.

The ball 102 may rest adjacent to and/or against the seats 112. The seats 112 may be annular (e.g., ring-shaped, substantially circular, etc.). The seats 112 may be configured to form a seal between the ball 102 and the valve body 104. In some embodiments, the seats 112 may have a complementary shape to the ball 102. For example, the seats 112 may exhibit a conical shape (e.g., frustoconical) with an angled inner surface. In some embodiments, the seats 112 may have a complex shape (e.g., an at least partially arcuate shaped cross section) such as a hemispherical slice configured to complement a spherical shape of the ball 102 (e.g., having substantially the same radius).

The ball valve 100 may include a purge assembly or system including one or more purge ports 120 positioned on and extending through the valve body 104 (e.g., a single port 120, two or more purge ports 120, etc.). As depicted, the purge ports 120 may be positioned along the longitudinal axis 118 (e.g., in mirrored arrangement relative to a centerline 130 of the passage 108). As discussed below, the one or more purge ports 120 may be positioned at various locations on the valve body 104. Further, as noted above, the positioning of the purge ports 120 may enable the purging of the ball valve 100 in the open position of the ball 102, the closed position of the ball 102, or in a position between the open position and the closed position of the ball 102.

In some embodiments, the purge ports 120 may be aligned such that fluid flow of the purge fluid is provided along a direction that is transverse (e.g., substantially perpendicular) to the longitudinal axis 118. For example, the purge ports 120 may be aligned such that fluid flow of the purge fluid is provided in a direction that is substantially parallel to the centerline 130 of the passage 108.

As best shown in FIG. 2, the purge ports 120 may be positioned in order to direct fluid flow into the valve body 104 and to at least partially redirect one or more portions of the fluid flow provided by the purge ports 120. For example, the purge ports 120 may be positioned such that the fluid flow of the purging medium is provided to the passage 108 and also to a portion of open volumes of the cavity 101 of the valve body 104 defined between the ball 102 and the valve body 104 (e.g., volumes 114, 116). In some embodiments, the purge ports 120 may be positioned such that the fluid flow impinges on one or more surfaces within the valve body 104. For example, the purge ports 120 may be positioned to direct the fluid flow to an interface 122 (e.g., an edge, a ridge, an annual ridge, etc.) of the outer surface 124 of the ball 102 and an inner surface 126 of the ball 102 that defines the passage 108. In such an embodiment, the fluid flow may be split between a first stream that travels substantially directly into the volumes 114, 116 of the cavity 101 positioned around the ball 102 and a second stream that continues (e.g., substantially directly travels) into the passage 108 within the ball 102. With such a split flow, a majority of the volumes of an interior of the ball valve 100 may have a direct supply of fluid in order to facilitate the direct purging of these portions without requiring the fluid to travel through intermediate portions of the ball valve 100 before reaching the desired volumes to be purged.

Stated in another way, the purge ports 120 may directly supply fluid to one or more portions of the ball valve 100 (e.g., by supplying the fluid substantially simultaneously, at the same time, without requiring the fluid to travel through other portions of the ball valve 100). For example, the purge ports 120 may each provide multiple fluid streams that simultaneously travel from purge ports 120 to portions of the ball valve 100 (e.g., the passage 108 and to the of volumes 114, 116 of cavity 101 between the ball 102 and the valve body 104) without having to travel through intermediate portions of the ball valve 100 before reaching the intended portions of the ball valve 100 to be purged.

Contact of the fluid flow with the interface 122 may cause at least a portion of the fluid flow to redirect into a different portion of the ball valve 100. For example, the fluid flow may contact the interface 122 and at least a portion of the fluid flow (e.g., between 1% and 99%, 10%, 20%, 30%, 40%, 50%, 60%, 70%, 80%, 90%) may be redirected to the one or more volumes 114, 116 of the cavity 101 of the valve body 104. In some embodiments, the remaining fluid flow may continue substantially in the same unaltered direction into the passage 108 (e.g., substantially straight into the passage 108 in a direction transverse to the longitudinal axis 118). In additional embodiments, multiple sections of the fluid flow may be redirected to various volumes of the ball valve 100 in which purging is desired.

In additional embodiments, a flow diverter may be implemented proximate a fluid exit and/or within the purge ports 120 in order to achieve the diverted flow configuration. For example, one or more flow diverters may be implemented in the purge ports 120 and/or in the valve body 104 (e.g., on the valve body 104 itself and/or on the ball 102) in order to direct fluid flow into the desired volumes within the ball valve 100.

The ball valve 100 may include a drain port 128 (e.g., positioned at a lower of lowermost portion of the valve body 104). In unison with the one or more purge ports 120, the drain port 128 creates one or more flow paths through the valve body 104. Such a configuration may promote the fluid flow from the purge ports 120, through the passage 108 and the volumes 114, 116 of the cavity 101, and exiting through the drain port 128.

In some embodiments, each of the purge ports 120 may include an aperture 132 defined through the valve body 104. As depicted, a fluid line 134 (e.g., tube) may be at least partially received within the respective aperture 132. The fluid line 134 may be fluidly connected (e.g., directly or indirectly) to a purging fluid source 136.

Each of the purge ports 120 may terminate at a fluid exit 138 defined by a portion of the purge ports 120 (e.g., defined by the aperture 132 and/or the fluid line 134). The purging fluid may exit the purge ports 120 at the fluid exit 138 where one or more portions of the purging fluid may be diverted as discussed above (e.g., diverted by the interface 122 or edge of the ball 102 or by another fluid diverting feature). For example, an arcuate edge defined by the interface 122 may extend about an opening of the passage 108 on one radial side of the ball 102 may act as a diverted for each purge ports 120 that is positioned about the arcuate interface 122 of the ball 102.

FIG. 3 illustrates a cross section of the ball valve 100 in an open position. In the open position, the passage 108 through the ball 102 may be substantially aligned with the conduit 106 through the valve body 104 such that fluid may pass through the ball valve 100. In some embodiments, in the open position, the purge ports 120 may no longer be aligned with the passage 108 through the ball 102. When the ball valve 100 returns to the closed position (e.g., as shown in FIGS. 1 and 2) or during the closing (e.g., in a partially closed position), the purge ports 120 may again be aligned with the passage 108 through the ball 102 such that a purge of the ball valve 100 may be performed with the purge ports 120.

Figure 4:
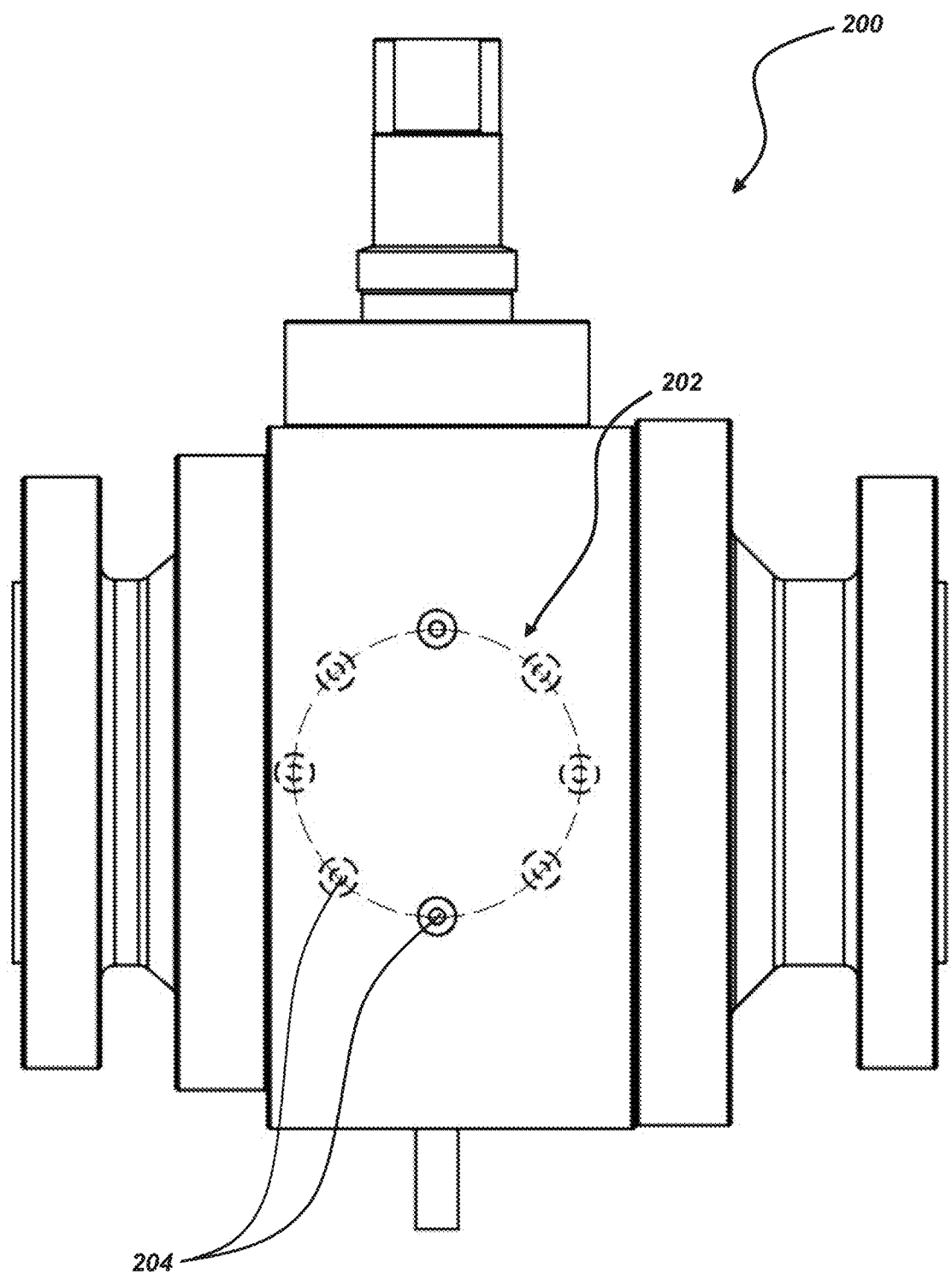
FIG. 4 is a side view of a valve including various potential locations of a purge assembly in accordance with an embodiment of the disclosure.

FIG. 4 is a side view of a valve 200 including various potential locations of a purge assembly 202. As shown in FIG. 4, the dashed line circles indicate flow locations 204 of the purge assembly 202. As will be appreciated, each of the flow locations 204 is positioned in a 360-degree configuration to align with a portion of the passage 108 of the ball 102 (e.g., the arcuate interface 122 as shown in FIG. 2). Given the size, properties of the fluid to be handled, and/or other flow characteristics, one or more of the flow locations 204 may be selected for a given application. While eight overall flow locations 204 are depicted, one, all, or even more than eight flow locations 204 may be implemented in a given application as is desired.

In some embodiments, the flow locations 204 may be positioned in a mirrored configurations (e.g., set substantially at 180 degrees relative to each other). In additional embodiments, smaller or larger spacing about the 360 degrees may be implemented (e.g., ±45 degrees, ±60 degrees, ±75 degrees, ±90 degrees, etc.).

Figure 5:
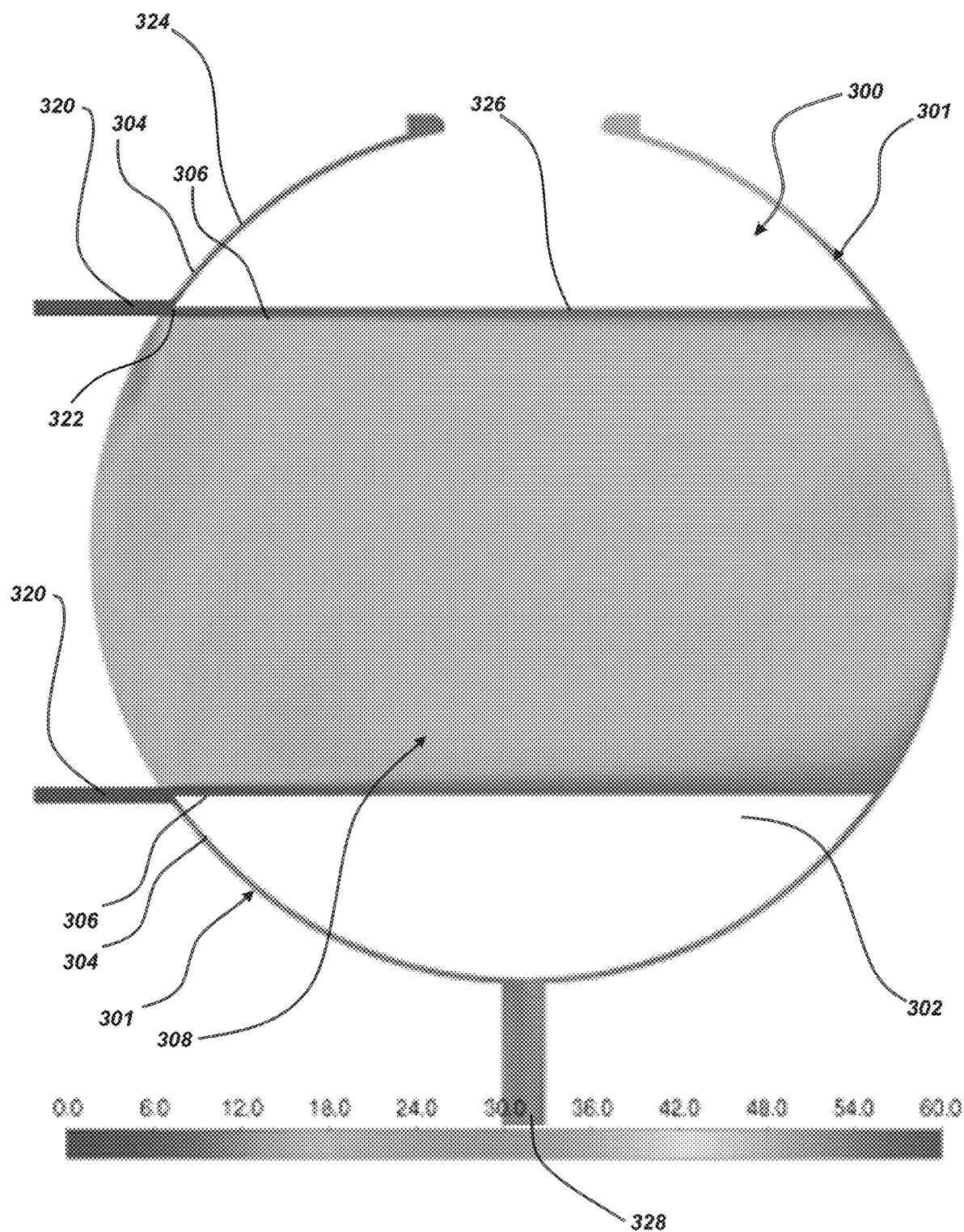
FIG. 5 is a fluid model of a valve showing fluid flow provided by a purge assembly in a valve in accordance with an embodiment of the disclosure.

FIG. 5 is fluid model 300 of a valve showing fluid flow provided by a purge assembly in a valve in accordance with an embodiment of the disclosure. As depicted, the fluid model 300 illustrates the relative residence time of the fluid (e.g., where the relatively darker area exhibit current or recent flow and the relatively lighter area show less recent or stagnant flow conditions). Stated in another way, the relatively darker areas indicate areas or volumes of active flow while the relatively lighter area indicate areas or volumes of less active or stagnant flow.

As shown in FIG. 5, purge ports 320 may provide split fluid flow that travels into a passage 308 within a valve element 302 while also directly supplying fluid flow about the valve element 302. As depicted, fluid flow may be separated into one or more streams (e.g., a first stream 304 and a second stream 306) by an obstruction 322 (e.g., an interior surface, edge, interface, etc. in the valve). For example, the first stream 304 may directly supply a portion of the fluid flow to outer surfaces 324 of the valve element 302 in order to clean those surfaces substantially directly while the second stream 306 substantially directly supplies another portion of the fluid flow to inner surfaces 326 of the valve element 302.

As discussed above, such configurations with separate or split streams 304, 306 may limit the overall amount of time required for the purging medium to travel to the locations that are desirable sites for the purging operation to be performed. As depicted, each of the purge ports 320 may supply the separated or split first stream 304 and second stream 306 to locations in the valve to be purged. As above, the number and location of the purge ports 320 may be selected to achieve the desired level of direct purging using any number of separated streams 304, 306.

In use, the diverted flow purging configuration may enable fluid to be supplied via the purge ports 320 directly to the locations in which purging is desired for a given application. The purge ports 320 are positioned to substantially directly supply fluid to a desired volume (e.g., the passage 308 of the valve element 302 in a substantially unobstructed flow). Using a portion of the valve (e.g., the edge of the valve element 302), the fluid may be diverted to be directly supplied to another volume in the valve housing (e.g., a cavity 301 surrounding at least a portion of the valve element 302).

In some embodiments, a drain port 328 enables the purging fluid to exit the valve housing by creating a fluid flow path extending through the valve between the purge ports 320 and the drain port 328.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated by the inventor.

What is claimed is:

1. A valve assembly comprising:
   a valve body having at least one fluid inlet and at least one fluid outlet;
   a valve member positioned within a cavity in the valve body and configured to selectively enable fluid to pass through the valve body via at least one passage in the valve member; and
   at least one purging assembly comprising at least one purge port extending through the valve body in order to supply a purge fluid into the valve body during a purging operation, the at least one purge port positioned on the valve body to substantially directly supply a first portion of the purge fluid into the at least one passage of the valve member while simultaneously substantially directly supplying a second portion of the purge fluid to a portion of the cavity in the valve body extending between the valve body and the valve member, wherein the at least one purge port is positioned and configured to enable an unredirected portion of the purge fluid to travel into the at least one passage defined through the valve member.

2. The valve assembly of claim 1, wherein the at least one purge port is positioned on the valve body to direct the purge fluid to one or more surfaces of the valve member in order to redirect a direction of fluid flow of at least one of the first portion of the purge fluid or the second portion of the purge fluid.

3. The valve assembly of claim 2, wherein the at least one purge port is positioned to direct the purge fluid to an interface between an inner surface of the valve member defining the at least one passage and an outer surface of the valve member.

4. The valve assembly of claim 3, wherein the interface of the valve member comprises an arcuate edge of the valve member extending about an opening of the at least one passage on one radial side of the valve member.

5. The valve assembly of claim 1, wherein the at least one purge port is positioned on the valve body to direct the purge fluid to one or more surfaces of the valve member in order to divide flow of the purge fluid into the first portion of the purge fluid and the second portion of the purge fluid.

6. The valve assembly of claim 1, wherein the at least one purge port is positioned on the valve body to direct the purge fluid to one or more surfaces of the valve member in order to enable the first portion of the purge fluid to continue along a flow path into the at least one passage of the valve member and to redirect the second portion of the purge fluid into the portion of the cavity in the valve body extending between the valve body and the valve member.

7. The valve assembly of claim 1, wherein the at least one purge port is positioned on the valve body to direct the purge fluid toward an obstruction in the valve body in order to diverge at least one of the first portion of the purge fluid or the second portion of the purge fluid.

8. The valve assembly of claim 1, wherein the valve assembly comprises a ball valve and the valve member comprises a rotatable ball positioned in the valve body.

9. The valve assembly of claim 1, further comprising a purge drain valve configured to drain the purge fluid supplied to the valve body with the at least one purging assembly.

10. The valve assembly of claim 1, wherein the at least one purge port comprises a single purge port.

11. The valve assembly of claim 1, wherein the at least one purge port comprises multiple purge ports.

12. A valve system comprising:
    a valve assembly comprising:
      a valve body having at least one fluid inlet and at least one fluid outlet; and
      a valve member positioned within a cavity in the valve body and configured to selectively enable fluid to pass through the valve body via at least one passage in the valve member; and
    at least one purging assembly comprising at least one purge port extending through the valve body in order to supply a purge fluid into the valve body, the at least one purge port positioned and configured on the valve body to direct a portion of the purge fluid as the purge fluid exits the at least one purge port by directing the purge fluid at an interface between an outer surface of the valve member and the at least one passage in the valve member, wherein the at least one purge port is positioned and configured to enable an unredirected portion of the purge fluid to travel into the at least one passage defined through the valve member.

13. The valve system of claim 12, wherein the valve assembly comprises a ball valve and the valve member comprises a rotatable ball positioned in the valve body.

14. The valve system of claim 12, wherein the at least one purge port is configured and positioned to direct the portion of the purge fluid to a portion of the cavity in the valve body extending between the valve body and the valve member.

15. The valve system of claim 14, wherein the at least one purge port is further configured and positioned to direct another portion of the purge fluid into the at least one passage of the valve member while simultaneously substantially directly supplying the portion of the purge fluid to the portion of the cavity in the valve body.

16. The valve system of claim 12, further comprising a purge fluid source fluidly coupled to the at least one purge port.

17. A method of purging a valve, the method comprising:
directing a purge fluid into a housing of a valve through at least one purge port extending through the housing of the valve, the housing of the valve having an inlet and an outlet;
supplying a first portion of the purge fluid from the at least one purge port into at least one passage defined through a valve member, the valve member being received within a cavity defined within the housing of the valve;
substantially simultaneously supplying a second portion of the purge fluid to a portion of the cavity in the housing extending between the housing of the valve and the valve member; and
enabling the first portion of the purge fluid to travel from the at least one purge port unaltered into the at least one passage defined through the valve member.

18. The method of claim 17, further comprising redirecting the second portion of the purge fluid with at least one surface of the valve member to direct the second portion of the purge fluid into the portion of the cavity.

19. The method of claim 17, further comprising removing a majority of the purge fluid through a purge drain port supplied to the housing of the valve through the at least one purge port.

20. The method of claim 17, further comprising redirecting at least one of the first portion of the purge fluid or the second portion of the purge fluid with an obstruction positioned within the housing of the valve.

\* \* \* \* \*